UNITED STATES PATENT OFFICE.

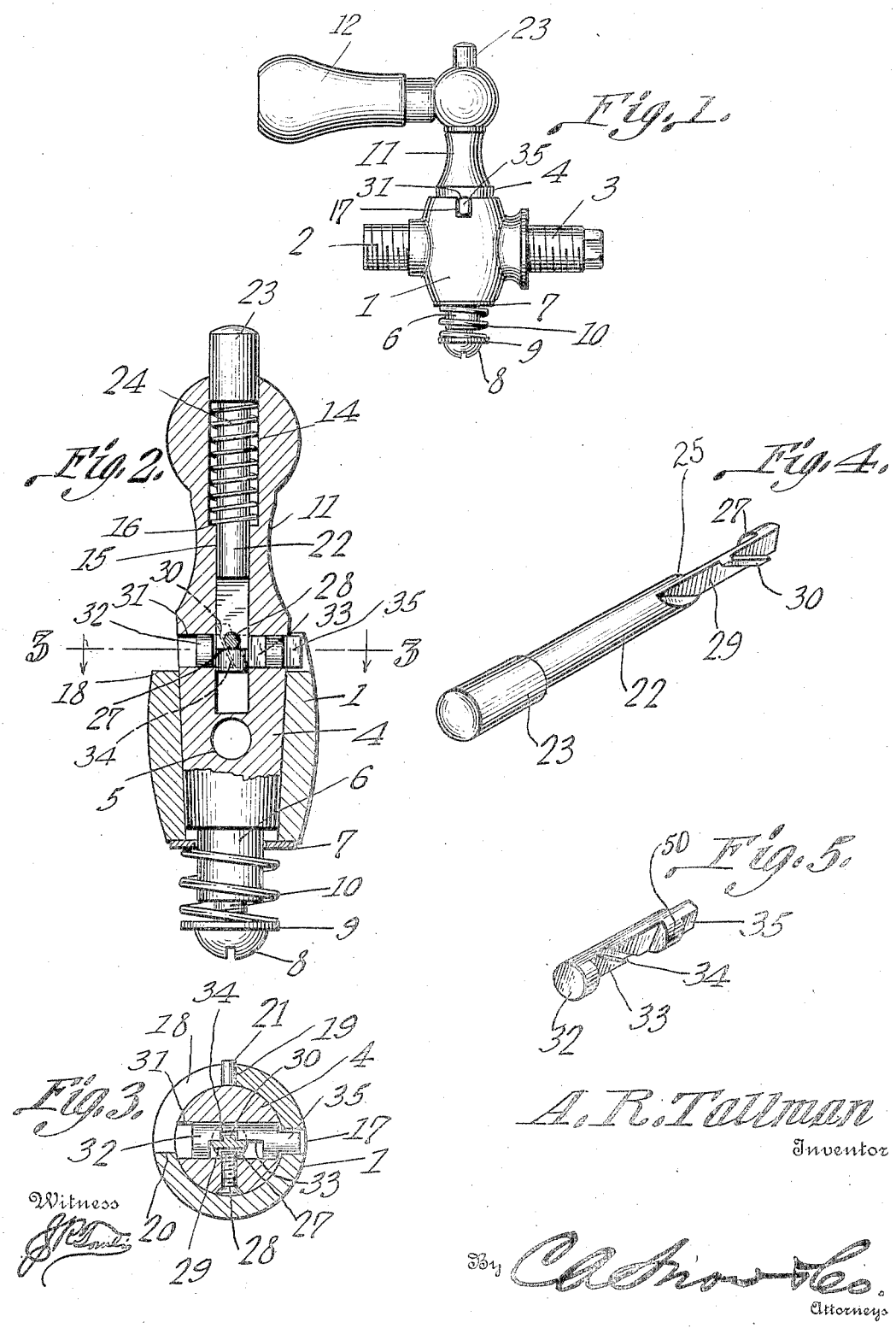

ALBERT ROMAINE TALLMAN, OF NASHVILLE, TENNESSEE.

GAS-COCK.

1,343,530.

Specification of Letters Patent.

Patented June 15, 1920.

Application filed October 20, 1919. Serial No. 331,770.

*To all whom it may concern:*

Be it known that I, ALBERT ROMAINE TALLMAN, a citizen of the United States, residing at Nashville, in the county of Davidson and State of Tennessee, have invented a new and useful Gas-Cock, of which the following is a specification.

The device forming the subject matter of this application is adapted primarily but not exclusively, to be used on gas stoves, to prevent the accidental manipulation of a valve. In use, the structure is not confined to gas stoves, since it may be employed under many other conditions which will suggest themselves readily to the user.

The invention aims to provide a simple but effective means whereby a valve may be locked against rotation thereby avoiding the well known and undesirable consequences which follow the accidental manipulation of a valve.

Within the scope of what is claimed, a mechanic may work changes without departing from the spirit of the invention.

In the drawings:—Figure 1 shows in side elevation, a device constructed in accordance with the invention; Fig. 2 is a section taken through the valve and attendant parts; Fig. 3 is a cross section on the line 3—3 of Fig. 2; Fig. 4 is a perspective view showing the actuating member; Fig. 5 is a perspective view disclosing the latch.

The numeral 1 marks a casing having an inlet 2 and an outlet 3, the terms above used being selected arbitrarily, since it is immaterial which direction the fluid takes in passing through the casing. A tapered valve 4 is rotatable in the casing 1 and includes a tip 6 surrounded by a washer 7 which abuts against the casing 1. A screw 8 is threaded in the tip 6 and retains a washer 9. A compression spring 10 is interposed between the washers 7 and 9 and holds the valve 4 seated in the casing 1. The valve 4 includes a stem 11 provided with a lateral handle 12. In the outer end of the stem 11 there is a bore 14 communicating with a reduced passage 15 in the valve 4, there being a shoulder 16 at the inner end of the bore 14. The valve 4 is supplied with a transverse passage 5 adapted to establish communication between the inlet 2 and the outlet 3 when the valve is rotated.

A seat 17 is fashioned in the upper edge of the casing 1, the upper edge of the casing being provided with a notch 18 extended approximately one fourth of the way around the casing, the notch forming shoulders 19 and 20. A pin or projection 21 is carried by the valve 4 and moves in the notch 18, the pin co-acting with the shoulders 19 and 20 in a way to be pointed out hereinafter.

The invention comprises an actuating member in the form of a plunger 22 mounted for right-line reciprocation in the passage 15 of the valve 4, and including an enlarged head 23 received slidably in the bore 14 of the valve. A compression spring 24 is mounted in the bore 14 between the head 23 of the plunger and the shoulder 16, the function of the spring being to move the plunger outward. The plunger 22 is cut away at one side, to form a shoulder 27. A detent, such as a screw 28, is mounted in the valve 4 and coöperates with the shoulder 27, to limit the outward sliding movement of the plunger under the action of the spring 24. The plunger 22 has a flat side 29 from which projects an inclined rib 30.

The valve 4 is supplied with a transverse bore 31, intersecting the passage 15. In the bore 31, a latch 32 is mounted for right-line reciprocation, in a direction at right angles to the direction in which the plunger 22 slides. The latch 32 is cut away to form a flat side 33 coöperating with the flat side 29 of the plunger 22. An inclined groove 34 is formed in the latch 32, the groove receiving the rib 30 of the plunger 22. One extremity of the latch 32 is reduced to form a pawl 35.

The spring 24 slides the plunger 22 upwardly, the rib 30 on the plunger coöperating with the groove 34 of the latch 32 to advance the latch. When the passage 5 establishes communication between the parts 2 and 3, the pawl 35 of the latch is received in the seat 17, the projection 21 coöperating with the shoulder 19. The plunger 22 may be pushed down against the action of the spring 24, withdrawing the pawl 35 from the seat 17. Then, the valve 4 may be rotated by means of the handle 12 until the projection 21 engages the shoulder 20. If pressure on the head 23 of the plunger 22 is released, the plunger will rise under the action of the spring 24, the parts 30 and 34 co-acting to advance the latch 32 so that the same will coöperate with the shoulder 19. The valve thus is locked in a closed position.

By way of summary, it may be stated that the device forming the subject matter of this application includes a casing 1, a valve 4 journaled in the casing, a latch 32 slidable in the valve and coöperating with the casing to hold the valve against rotation, the latch being cut away to form a flat side 33 leaving disk-like bearing portions 50 adjacent to the ends of the latch, and there being an inclined groove 34 in the flat side 33 of the latch. The disk-like bearing portions 50 obviously give adequate support to the latch in its sliding movement. A plunger 22 is slidable in the valve 4 and is disposed at right angles to the latch 32, the plunger being cut away on one side, as shown at 25, to form a shoulder 27, and being cut away on its opposite face to form a flat side 29 in slidable contact with the flat side 33 of the latch. Because the flat sides of the latch and the plunger operate as above described, adequate wearing area is afforded, and the parts retain proper relation to each other. An inclined rib 30 projects from the flat side of the plunger and is received in the groove 34 of the latch. The spring means 24 coöperates directly with the plunger to retract the plunger, and the detent 28, coöperating with the shoulder 27, limits the outward movement of the plunger under the action of the spring means.

The invention provides a simple but effective means whereby a valve may be locked releasably in an open position or in a closed position.

I claim:—

In a device of the class described, a casing; a valve journaled in the casing; a latch slidable in the valve and coöperating with the casing to hold the valve against rotation, the latch being cut away to form a flat side leaving disk-like bearing portions adjacent to the ends of the latch, there being an inclined groove in the flat side of the latch; a plunger slidable in the valve and disposed at right angles to the latch, the plunger being cut away on one side to form a shoulder, and being cut away on its opposite face to form a flat side in slidable contact with the flat side of the latch, there being an inclined rib projecting from the flat side of the plunger and received in the groove of the latch; spring means coacting directly with the plunger to retract the plunger; and a detent in the valve, the detent coacting with the shoulder of the plunger to limit the movement of the plunger under the action of the spring means.

In testimony that I claim the foregoing as my own, I have hereto affixed my signature in the presence of two witnesses.

ALBERT ROMAINE TALLMAN.

Witnesses:
  Sonoma Maslin,
  L. G. Boxwell.